A. C. AUSTIN.
Water-Gate or Stop-Valve.
No. 203,985. Patented May 21, 1878.
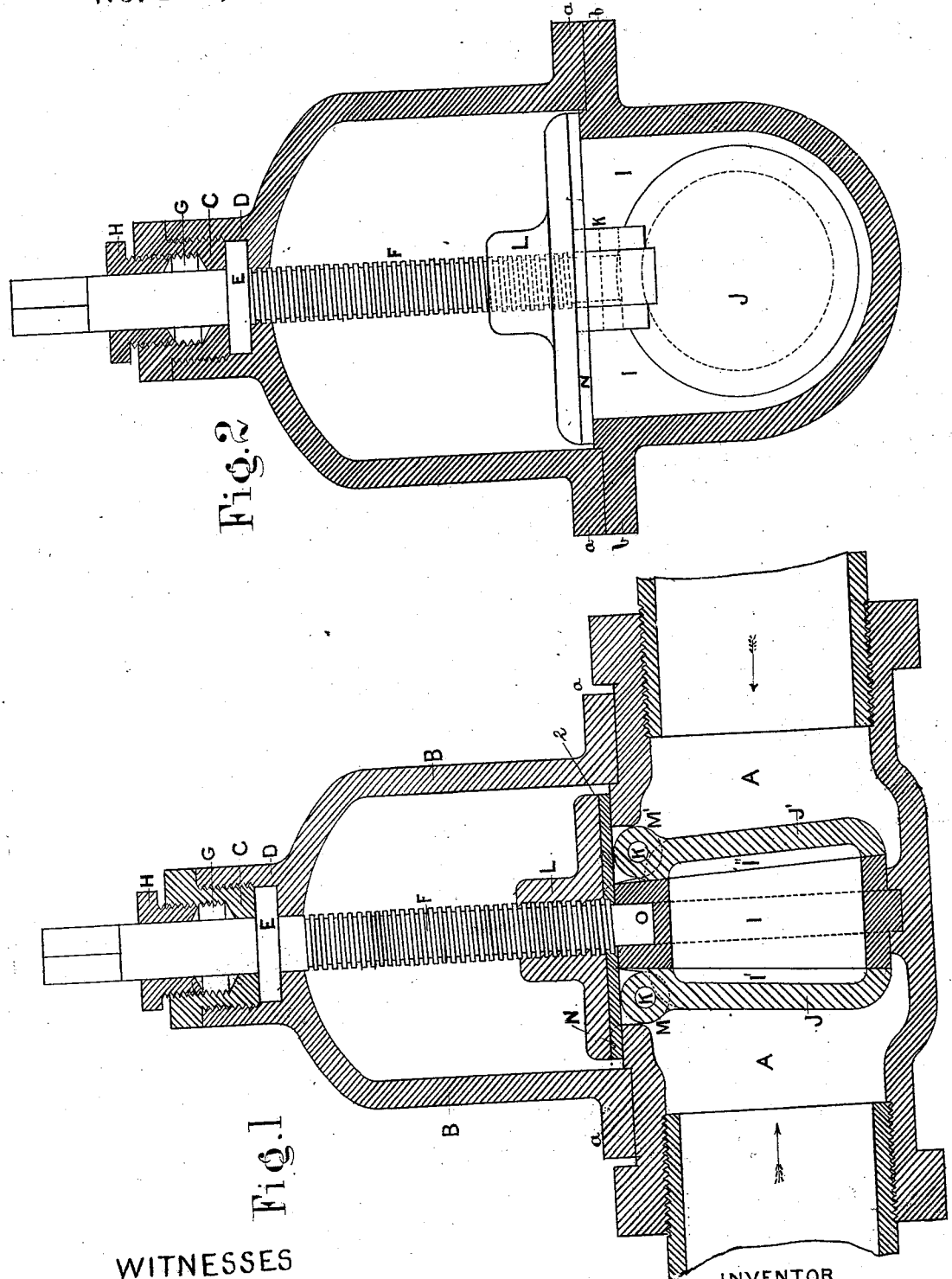

UNITED STATES PATENT OFFICE.

ALVAH C. AUSTIN, OF OAKLAND, CALIFORNIA, ASSIGNOR TO ANTHONY CHABOT, OF SAME PLACE.

IMPROVEMENT IN WATER-GATES OR STOP-VALVES.

Specification forming part of Letters Patent No. 203,985, dated May 21, 1878; application filed March 22, 1878.

*To all whom it may concern:*

Be it known that I, ALVAH C. AUSTIN, of Oakland, Alameda county, State of California, have invented an Improved Water-Gate or Stop-Valve, of which the following is a specification:

This valve is more particularly intended for use as a water-gate, although its principle of construction may be found applicable in the case of steam-valves, &c.

In Figure 1 of the accompanying drawing I show a longitudinal sectional elevation of my valve, which fully illustrates the principle involved, Fig. 2, which is a transverse sectional elevation, being given to further explain the mechanical construction.

Like letters of reference refer to like parts in both figures.

A is the shell of the valve, which will have the usual provision made at the inlet and outlet openings for the attachment of the conducting-pipes.

In Fig. 1, I have shown pipes screwed into the inlet and outlet mouths of the shell.

B is a casing inclosing the chamber, into which the valves recede when the passage for the water is opened. This casing is attached to the shell A by bolts passing through the flanges *a* and *b*.

C is a screw-nut, which is screwed into the boss D, formed in the center of the upper end of the casing B, and which, being screwed down upon the collar E of the screw-spindle F, prevents the spindle from rising.

A recess, G, is formed in the nut C, to allow for the packing of the spindle F, the screw-gland H being provided to tighten the packing, as required.

The arrangement of the foregoing parts are subject to modifications and changes, according to the conditions under which they may be applied.

I is the piece which forms the main valve-seats. It is ordinarily made of brass, and must be firmly secured in the shell A. It may be in one or two pieces, as found most convenient. In very small valves I prefer to make the seats in one piece. In larger valves I may economize labor and material by making them in two pieces.

The faces or seats I′, I″ are inclined, as shown in Fig. 1.

J J′ are the valves, which are hinged at K to the lugs which depend from the valve or cover L.

The secondary valve or cover L, which forms also the screw-nut which raises and lowers the valves J J′, is provided to close the openings at M M′, through which the valves J J′ must pass when they are being raised or lowered. This valve L may have a rubber facing, N, if found necessary.

The screw-spindle F will rest in a step-box, O, formed in the seat-piece I in small valves; but in larger valves, when it can be so arranged, there will be a rib-piece cast solid with the shell A, in which this step-box may be made.

The operation is as follows: The water may be supposed to enter from either direction, as shown by the arrows. If the valves J J′ are raised, a free passage-way is open through the seat-piece I. Now, when the valves are lowered, so as to cover the opening through the seat-piece, the pressure on the back of the valve on that side from which the water flows will cause that valve to press tightly upon its seat and effectually close this main passage-way, the passage-ways M M′ being closed by the secondary valve L, which must be tightly pressed down upon its seat by turning the spindle F.

The pressure of water under the valve L materially assists the operator in the act of raising the valves J J′, and the inclination given the two seats I′ I″ insures the immediate relief of the water-pressure from the back of the valves as soon as they are given the slightest upward movement, for then they leave their seats, and the pressure in front and at back becomes equalized.

In the hinges K it will be necessary to allow a slight horizontal play in direction of the arrows, Fig. 1, so as to allow the valves to adjust themselves to their seats.

What I claim as my invention, and desire to secure by Letters Patent, is as follows:

The valves J J′ hinged to and depending from the valve and screw-nut L, in combination with their respective seats and the valve-casing, arranged and operated as and for the purpose herein described.

ALVAH C. AUSTIN.

Witnesses:
  GEORGE PARDY,
  JNO. PARDY.